United States Patent [19]

Nakagawa et al.

[11] Patent Number: 4,717,929
[45] Date of Patent: Jan. 5, 1988

[54] CAMERA AUTO SENSING SYSTEM FOR ISO SPEED

[75] Inventors: Norifumi Nakagawa; Toyonori Sasaki; Kunio Matsumoto, all of Tokyo, Japan

[73] Assignee: Copal Company Limited, Tokyo, Japan

[21] Appl. No.: 843,629

[22] Filed: Mar. 25, 1986

[30] Foreign Application Priority Data

Mar. 25, 1985 [JP] Japan .................. 60-42763[U]

[51] Int. Cl.$^4$ ............................................. G03B 7/24
[52] U.S. Cl. .................................... 354/21; 354/482
[58] Field of Search ............................ 354/21, 482

[56] References Cited

U.S. PATENT DOCUMENTS 3,601,025 8/1971 Stieringer ........................ 354/482
4,074,286 2/1978 Suzuki ............................. 354/21

FOREIGN PATENT DOCUMENTS 58-219536 12/1983 Japan .

Primary Examiner—Russell E. Adams
Attorney, Agent, or Firm—Cushman, Darby & Cushman

[57] ABSTRACT

In order to make possible the automatic setting of the sensitivity of a film to be used in an exposure controlling system by a simplified structure manufacturable at a low cost, the camera auto sensing system for ISO speed comprises: a pair of switches rendered to either a conductive state or a non-conductive state by judging a digital pattern indicative of the film sensitivities provided on a film cartridge mounted in a camera; a pair of electromagnets connected to respective switches; a film sensitivity changing lever coupled to the armatures of the respective electromagnets so as to be allowed to be moved to four positions in accordance with the operative state and the non-operative state of the respective electromagnets; and light amount changing means coupled to the film sensitivity changing lever to change the amount of light incident to an exposure-controlling light-receiving device in accordance with the movement of the changing lever. Thus, in this system, the sensitivity of the film to be used is sensed and set to the exposure-controlling system at each shutter release.

9 Claims, 4 Drawing Figures

CAMERA AUTO SENSING SYSTEM FOR ISO SPEED

BACKGROUND OF THE INVENTION (a) Field of the Invention

The present invention relates to a device for automatically setting the film sensitivity of the film to be used in a photographic camera, and more particularly, pertains to a camera auto sensing system for ISO speed for an exposure-controlling system suitable for a camera of the type which uses a film cartridge provided with a digital code pattern indicative of film information such as film-sensitivity or film speed.

(b) Description of the Prior Art

Prior art devices for automatically sensing the film-sensitivity of the film to be used in compliance with the film cartridge provided with a digital code pattern indicative of film information such as ISO (International Standard Organization) speed, number of exposures, etc., have been designed to perform purely electric processing through mathematical operation. Other prior art devices are designed to perform electro-mechanic processing by a combination of the opening and closing actions of the rear cover of a camera with the operative or inoperative state of an electromagnet. The former has the drawback that the circuitry is complicated and expensive, whereas the latter has the drawback that the interlocking mechanism between the rear cover and the operating member of the electromagnet becomes complicated.

SUMMARY OF THE INVENTION

It is, therefore, a primary object of the present invention to provide a camera auto sensing system for ISO speed which is suitable for film cartridges of the above-mentioned type and which has a simplified structure that can be manufactured at a relatively low cost.

Another object of the present invention is to provide a camera which is arranged not to perform sensing of the film sensitivity interlockingly with the opening and closing of the rear cover of the camera, but is instead arranged to sense the film sensitivity for each release operation of the shutter thereof.

These and other objects of the present invention as well as the features and advantages thereof will be apparent from the following detailed description of the preferred embodiment when taken in conjunction with the accompanying drawings.

DETAILED DESCRIPTION OF THE PREFERRED EMBODIMENT

Figure 1:
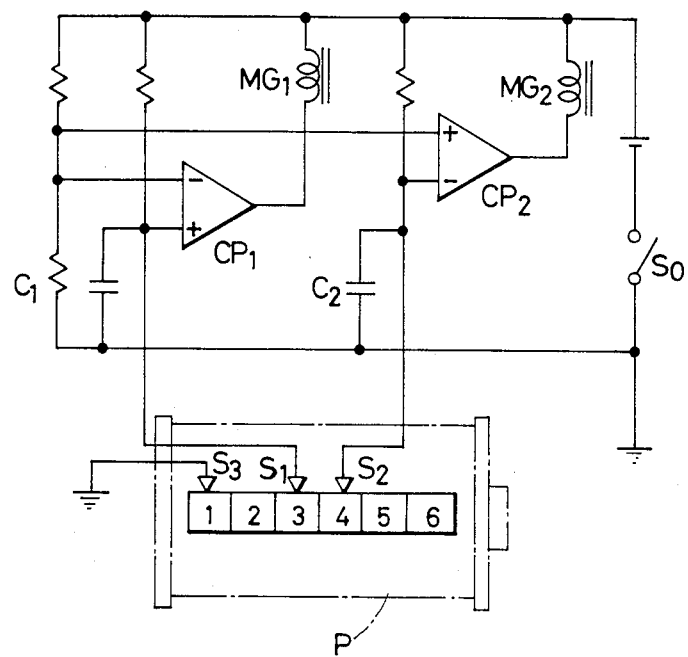
FIG. 1 is a circuit diagram schematically showing an embodiment of the controlling circuit portion of the device according to the present invention and schematically showing the arrangement of a digital code pattern indicative of information such as film sensitivity and also the arrangement of switches which are provided on a film cartridge mounted in a camera.
Figure 2:
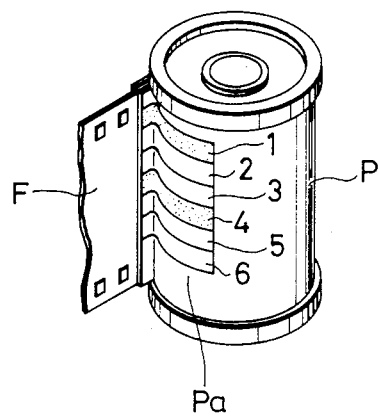
FIG. 2 is a perspective view showing the film cartridge provided with the digital code pattern.

In FIGS. 1 and 2, symbol $S_0$ represents a power supply switch, and $S_1$ and $S_2$ represent contacts which are brought into contact with a specific one of the arrayed bits provided in a digital code pattern $P_a$ which, in turn, is formed on the outer circumferential surface of a film cartridge P when mounted in a camera. This digital code pattern is indicative of information such as the film sensitivity and is determined by judging whether the contacted portion represents a conducting zone or a non-conducting zone $S_3$ represents a contact which is to be brought into common contact with all of the conducting zones so as to connect them to earth. $CP_1$ and $CP_2$ represent comparators, and $MG_1$ and $MG_2$ represent electromagnets. Capacitors $C_1$ and $C_2$, which are connected in parallel to the switches $S_1$ and $S_2$, respectively, are intended to prevent erroneous operation of the switches $S_1$ and $S_2$ due to chattering.

Figure 3:
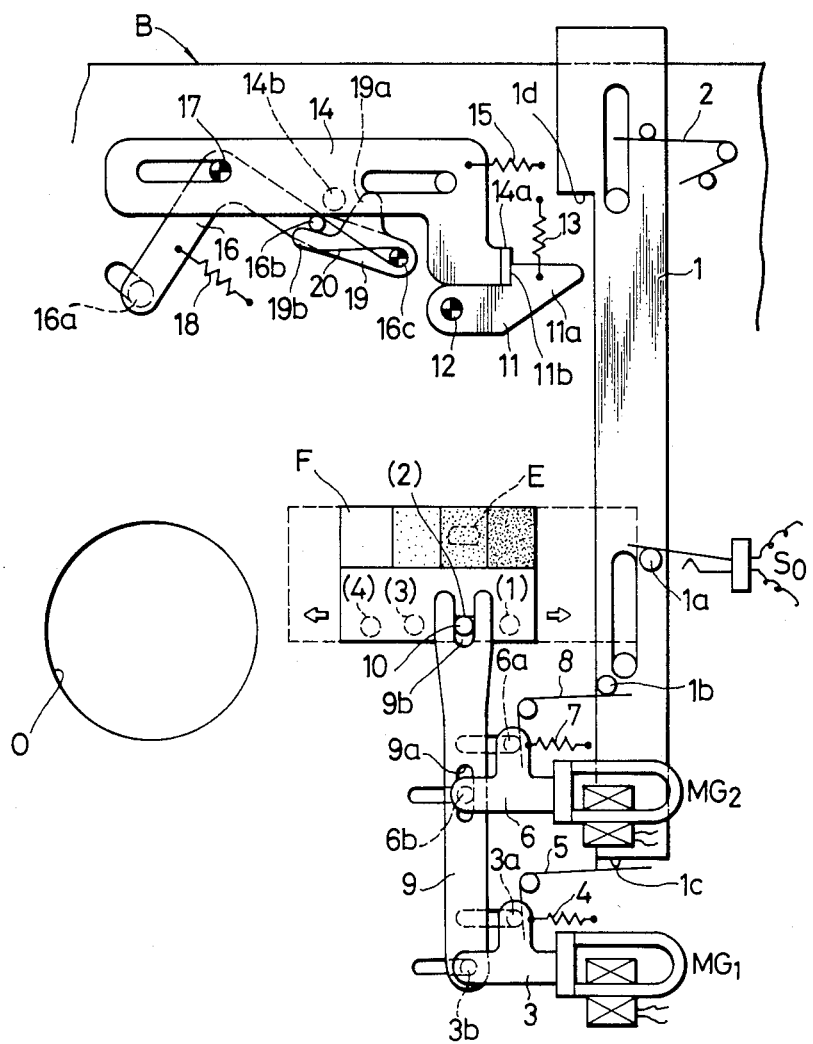
FIG. 3 is an explanatory illustration showing an embodiment of the controlling mechanism portion of the device according to the present invention.

In FIG. 3, reference numeral 1 represents a release plate disposed, for vertical movement, on a shutter base plate B which has an exposure aperture 0 which is urged to make an ascending movement. The release plate also has outwardly-extending pins 1a and 1b and a bent portion 1c and a shoulder portion 1d. The pin 1a is intended to operate the power supply switch $S_0$. $MG_1$ and $MG_2$ are the electromagnets, and they are fixedly arranged on the base plate B as shown. Numeral 3 represents a first armature disposed on the base plate B for movement sideways and for facing the electromagnet $MG_1$ so as to be urged by a spring 4 to move toward the right side. Armature 3 also has a pin 3a and a supporting axis 3b which extend therefrom outwardly. Numeral 5 represents a spring spanned between the bent portion 1c of the release plate 1 and pin 3a. In its illustrated state, this spring 5 is weaker than the spring 4. However, as it is charged by a descending movement of the release plate 1, the spring 5 will be imparted a greater tension than the spring 4.

Numeral 6 represents a second armature disposed on the base plate B for movement sideways and for facing the electromagnet $MG_2$ so as to be urged by a spring 7 to move toward the right side. Armature 6 also has pins 6a and 6b extending outwardly therefrom. Numeral 8 represents a spring spanned between the pin 1b of release plate 1 and pin 6a. In its illustrated state, this spring 8 is weaker than the spring 7, but as it is charged by the descending movement of the release plate 1, the spring 8 will gain a tension greater than that of the spring 7.

Numeral 9 represents a film sensitivity changing lever rotatably secured to the supporting axis 3b which is provided on the first armature 3, and it also contains a slot 9a for fitting therein the pin 6b of the second armature 6 and a bifurcated portion 9b. Numeral 10 represents a filter operating member disposed on the base plate B for movement sideways for presenting, for example, a filter (optical wedge) F to the face of an automatic exposure controlling light-receiving device E of an EE shutter and for retreating same therefrom, and it is coupled to the bifurcated portion 9b of the film sensitivity changing lever 9.

Numeral 11 represents a shutter release lever rotatably secured on the base plate B by an axis 12 and which is urged to rotate counter-clockwise by a spring 13. Shutter release lever 11 also has an arm portion 11a which is urged to move by the shoulder portion 1d of the release plate 1 and contains a hook portion 11b. Numeral 14 represents an opening-driver plate disposed on base plate B for movement sideways and which is urged to move toward the right side by a spring 15. Driver plate 14 includes a bent portion 14a which is to be anchored by the hook 11b of the shutter release lever 11 and includes an outwardly extending pin 14b. Numeral 16 represents an opening-and-closing lever rotatably secured on the base plate B by an axis 17 and which is urged to rotate counter-clockwise by a spring 18 opening-and-closing lever 16 also includes outwardly extending pins 16a and 16b and supporting axis 16c. The pin 16a drives the operating member of a shutter blade not shown so as to produce reciprocating movements. The EE control of the shutter is of such a type as to move the fulcrum of rotation of the operating member in accordance with the amount of deviation of a galvanometer.

Numeral 19 represents a lever which is rotatably secured to the supporting axis 16c, and it has an arm portion 19a which is urged to move by the pin 14b of the opening-driver lever 14 and contains an arm portion 19b whose clockwise rotation is limited as it is brought into contact with the pin 16b. Numeral 20 represents a spring spanned between the lever 19 and the pin 16b, and it urges the lever 19 to rotate clockwise.

A certain kind of film cartridge P is provided with a digital code pattern indicative of information such as film sensitivity or the like as shown in Table 1. Here, symbol "H" indicates a non-conducting zone, and symbol "L" denotes a conducting zone.

| Film sensitivity | Digital Code Pattern Bit | | | | | |
|---|---|---|---|---|---|---|
| | 1 | 2 | 3 | 4 | 5 | 6 |
| 25 | | | H | H | | |
| 50 | | | H | H | | |
| 100 | | | L | H | | |
| 200 | | | L | H | | |
| 400 | | | H | L | | |
| 800 | | | H | L | | |
| 1600 | | | L | L | | |
| 3200 | | | L | L | | |

Let us pay attention to the row of bits in the third column and also the row of bits in the fourth column. As will be clear from the above Table, the film sensitivity which is to be judged will have some allowance such as $25 \sim 50$, $100 \sim 200$, $400 \sim 800$, $1600 \sim 3200$. In reality, however, the films have a latitude, and thus no problem arises. Arrangement is provided so that when the film cartridge P is mounted in a predetermined location within the camera body (not shown), the contact $S_1$ will detect either the conducting zone or the non-conducting zone in the row of bits contained in the third column, whereas the contact $S_2$ detects either the conducting zone or the non-conducting zone in the row of bits contained in the fourth column. The contact $S_3$ touches all the conducting zones in common and connects them to earth.

Let us now assume that a film cartridge P carrying a film having a film sensitivity of 100 or 200 is charged on a camera. In this case, conduction is established across the contact $S_1$ and the contact $S_3$, whereas non-conduction is brought about across the contact $S_2$ and the contact $S_3$. Accordingly, if the release plate 1 is depressed against the tension of the spring 2 by a release operation and the displaced pin 1a thus closes the power supply switch $S_0$, the comparators $CP_1$ and $CP_2$ will both deliver their outputs of "L" level, thereby causing the electromagnets $MG_1$ and $MG_2$ to be energized to attract and hold the first armature 3 and the second armature 6. As a result, even when the release operation progresses and charges the springs 5 and 8, the armatures 3 and 6 are held in the illustrated positions so that the film sensitivity changing lever 9 is held in its illustrated position. Accordingly, the filter changing member 10 is retained in its position 2 illustrated, thereby causing a filter F (2) corresponding to a film sensitivity of a value averaged between 100 and below 400, or of a value most frequently used in the above-mentioned range, to be brought to the position facing the light-receiving device E.

Also, when a film cartridge P of a film sensitivity 50 is charged in the camera, non-conduction is established invariably across the contacts $S_1$, $S_2$ and $S_3$, thereby rendering the electromagnet $MG_1$ non-energized, while energizing the electromagnet $MG_2$. Accordingly, the second armature 6 is held in its illustrated position. However, the first armature 3 is not retained, but is caused by the tension of the spring 5 to move toward the left side against the tension of the spring 4. As a result, the film sensitivity changing lever 9 makes a clockwise rotation about the fitting site of the pin 6b and the slot 9a, which serves as the fulcrum for the rotation, causing the filter changing member 10 to be displaced onto the position (1). Consequently, due to the displacement of the member 10, the filter F(1) which corresponds to the film sensitivity of an averaged value of below 100 or a value most often used in such a range is brought to face the light-receiving device E.

Similarly, when the two electromagnets $MG_1$ and $MG_2$ are both in their non-energized state, the filter-changing member 10 is dispaced to the position (3). Also, when only the electromagnet $MG_1$ is energized, the filter-changing member 10 is dispaced to the position (4).

Also, as the release operation progresses further due to the depression of the release plate 1, and the shoulder portion 1d thus urges the arm position 11a to move, thereby causing the shutter release lever 11 to rotate clockwise against the tension of the spring 13, the hook 11b is detached off the bent portion 14;I a. As a result, the opening-driver plate 14 moves toward the right side by the tension of the spring 15, and this movement causes the pin 14b to urge the arm portion 19a of the lever 19. Therefore, the opening-and-closing lever 16 receives the force of the arm portion at its pin 16b via the arm portion 19b of the lever 19 and is thereby caused to rotate clockwise against the tension of the spring 18, thereby causing the shutter blade (not shown) to open. Also, when the pin 14b passes the arm portion 19b, the opening-and-closing lever 16 is caused to make a counter-clockwise rotation by the tension of the spring 18, so as to close the shutter blade. When, during the shutter cocking operation, the opening-drive plate 14 is returned to its illustrated position from its rightwardly assumed position, the arm portion 19a is urged to move by the pin 14b from the right side noted in the drawing. However, because only the lever 19 makes a counter-clockwise rotation against the tension of the spring 20 by using the supporting axis 16c as its fulcrum of rotation and lets the pin 14b pass thereby, the shutter blade is not affected at all.

Description has been given above of an embodiment with respect to the electro-mechanic mechanism wherein the film sensitivity is divided into four zones to be automatically sensed easily. In case, however, the film sensitivity is further simply divided into only two categories (for example, above 400 or below 400) and subjected to automatic sensing, the provision of only one pair of contacts and electromagnets will suffice. Still further, the controlling circuit of the electromagnets does not always need to use comparators. The provision of a circuit containing a mere simple arrangement of power supply—power supply switch—electromagnet (coil)—contact will suffice.

Figure 4:
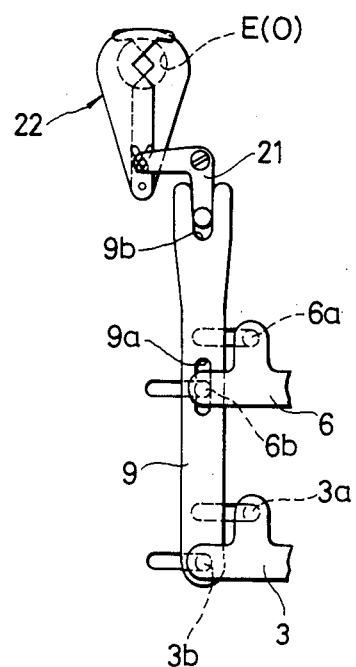
FIG. 4 is a partial illustration showing another embodiment of the controlling mechanism portion shown in FIG. 3.

In the above-described embodiment, an arrangement is provided so that by inserting a filter in front of the exposure-controlling light-receiving device E, the information concerning, for example, the sensitivity of the film to be used is introduced to the exposure controlling system. This can be also achieved by changing the light-receiving area of the light-receiving device E by means of a stop means interlocked with the film sensitivity changing lever 9 as shown in FIG. 4. That is, in FIG. 4 numeral 21 represents a lever rotatably supported on the base plate B and having one end engaging the bifurcated portion 9b of the film sensitivity changing lever 9. Numeral 22 represents a well-known stop means comprised of a pair of aperture blades rotatably supported, by a common axis, on the base plate B so as to be able to alter the light-receiving area of the exposure-controlling light-receiving device E and which is connected in pin-slot fashion to the other end of the lever 21.

It should be noted here that even by constructing the device so as to change the area of the exposure aperture 0 by this stop means it is still possible to introduce information such as the film sensitivity to the exposure-controlling system. In order to alter the light-receiving area of the light-receiving device E, there may also be employed in place of the filter F a single light-blocking plate provided with openings of mutually different sizes at locations corresponding to the positions (1), (2), (3) and (4).

What is claimed is:

1. A camera auto sensing system for ISO speed, comprising:
   a controlling circuit including switch means provided on a film cartridge mounted for use and set to either a conduction state or a non-conduction state in cooperation with at most two zones selected among a plurality of zones of a digital code pattern indicative of film sensitivity information, electromagnet means connected to said switch means, and a power supply switch connected across said switch means and said electromagnet means via a power supply so as to be closed by a shutter release;
   an armature member disposed in association with said electromagnet means so as to move between a first position engaging said electromagnet means and a second position detached from said electromagnet means; and
   a film sensitivity changing lever coupled to said armature member which is moved to mutually different positions in accordance with a movement of said armature member, wherein information concerning sensitivity of a film to be used is introduced to an exposure controlling system by operating said film sensitivity changing lever via said switch means, said electromagnet means and said armature member whenever a shutter release is performed.

2. A camera auto sensing system according to claim 1, further comprising:
   an exposure-controlling light-receiving device; and
   light amount changing means disposed in front of said exposure-controlling light-receiving device and coupled to said film sensitivity changing lever so as to introduce the sensitivity information of a film to be used to an exposure-controlling system.

3. A camera auto sensing system according to claim 2, in which:
   said light amount changing means is a filter member having a plurality of mutually different filter portions.

4. A camera auto sensing system according to claim 3, in which:
   said filter member is an optical wedge.

5. A camera auto sensing system according to claim 2, in which:
   said light amount changing means is a stop means.

6. A camera auto sensing system according to claim 1, further comprising:
   a stop means connected to said film sensitivity changing lever for changing an exposure aperture diameter in order to introduce to an exposure controlling system information concerning the sensitivity of a film to be used.

7. A camera auto sensing system according to claim 1, in which:
   said electromagnet means is comprised of a single electromagnet, and
   said film sensitivity changing lever is moved to either one of two mutually different positions whenever the shutter release is performed.

8. A camera auto sensing system for ISO speed, comprising:
   a controlling circuit including switch means provided on a film cartridge mounted for use and set to either a conduction state or a non-conduction state in cooperation with at most two zones selected among a plurality of zones of a digital code pattern indicative of film sensitivity information, electromagnet means connected to said switch means, a power supply switch connected across said switch means and said electromagnet means via a power supply so as to be closed by a shutter release, and a capacitor connected in parallel with said switch means to prevent chattering;
   an armature member disposed in association with said electromagnet means so as to move between a first position engaging said electromagnet means and a second position detached from said electromagnet means; and
   a film sensitivity changing lever coupled to said armature member so as to be moved to mutually different positions in accordance with a movement of said armature member, wherein information concerning sensitivity of a film to be used is introduced to an exposure controlling system by operating said film sensitivity changing lever via said switch means, said electromagnet means and said armature member whenever a shutter release is performed.

9. A camera auto sensing system for ISO speed, comprising:
   a controlling circuit including switch means comprised of two independent contacts provided on a film cartridge mounted for use and set to either a conduction state or a non-conduction state in cooperation with at most two zones selected among a plurality of zones of a digital code pattern indicative of film sensitivity information, electromagnet means comprised of two mutually independent electromagnets connected to said switch means, and a power supply switch connected across said switch means and said electromagnet means via a power supply so as to be closed by a shutter release, said two independent contacts of said switch means being connected to said two electromagnets, respectively;

an armature member disposed in association with said electromagnet means so as to move between a first position engaging said electromagnet means and a second position detached from said electromagnet means; and a film sensitivity changing lever coupled to said armature member so as to be moved to mutually different positions in accordance with a movement of said armature member, said film sensitivity changing lever being moved to one of four mutually different positions whenever a shutter release is performed, wherein information concerning sensitivity of a film to be used is introduced to an exposure controlling system by operating said film sensitivity changing lever via said switch means, said electromagnetic means and said armature member whenever the shutter release is performed.

* * * * *